(12) United States Patent
Mujtaba et al.

(10) Patent No.: US 6,950,678 B1
(45) Date of Patent: Sep. 27, 2005

(54) CONTROL TECHNIQUE FOR A COMMUNICATION SYSTEM

(75) Inventors: Syed Aon Mujtaba, Berkeley Heights, NJ (US); Thaddeus John Gabara, Murray Hill, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/576,999

(22) Filed: May 24, 2000

(51) Int. Cl.[7] .......................... H04Q 7/20; H04B 1/38; H01Q 3/24
(52) U.S. Cl. .................. 455/562.1; 455/561; 455/443; 455/444; 455/447; 455/449; 342/368
(58) Field of Search .............................. 455/436–453, 455/456, 561, 562, 562.1, 522–526; 342/146, 342/154, 359, 360, 361, 368, 369, 428, 429, 342/434

(56) References Cited

U.S. PATENT DOCUMENTS

| | | | |
|---|---|---|---|
| 4,743,871 A * | 5/1988 | Searle ........................ 333/166 |
| 5,272,663 A * | 12/1993 | Jones et al. ................. 364/825 |
| 5,317,322 A * | 5/1994 | Grobert ....................... 342/378 |
| 5,513,176 A * | 4/1996 | Dean et al. ................... 370/18 |
| 5,548,813 A * | 8/1996 | Charas et al. ............. 455/33.3 |
| 5,551,060 A * | 8/1996 | Fujii et al. ................. 455/33.4 |
| 5,627,879 A * | 5/1997 | Russell et al. ................ 379/59 |
| 5,818,829 A * | 10/1998 | Raith et al. .................. 370/347 |
| 5,835,062 A * | 11/1998 | Heckaman et al. ......... 343/700 |
| 6,091,788 A * | 7/2000 | Keskitalo et al. ........... 375/347 |
| 6,212,406 B1 * | 4/2001 | Keskitalo et al. ........... 455/562 |
| 6,351,461 B1 * | 2/2002 | Sakoda et al. .............. 370/342 |
| 6,373,888 B1 * | 4/2002 | Lindoff ....................... 375/231 |
| 6,453,166 B1 * | 9/2002 | Ishikawa et al. ............ 455/450 |
| 6,593,880 B2 * | 7/2003 | Velazauez et al. .......... 342/367 |
| 6,700,923 B1 * | 3/2004 | Dowling et al. ............ 375/148 |

FOREIGN PATENT DOCUMENTS

| | | |
|---|---|---|
| EP | 0531090 A2 | 9/1992 |
| WO | WO 97/44908 | 11/1997 |
| WO | WO 98/19488 | 5/1998 |
| WO | WO 98/34294 | 8/1998 |

OTHER PUBLICATIONS

Ohgane et al., "A Study on a Channel Allocation Scheme with an Adaptive Array in SDMA", Hokkaido University, May 4-7, 1997, pp. 725-729.
Richard H. Roy, "An Overview of Smart Antenna Technology: The Next Wave in Wireless Communications", National Engineering Consortium, 1998, pp. 941-945.

* cited by examiner

*Primary Examiner*—William Trost
*Assistant Examiner*—Meless Zewdu (57) ABSTRACT

A control technique for a communication system in which a microcell base station is co-located with a macrocell base station. The microcell base station tracks hot spots as they move within the macrocell. The microcell base station may utilize a two-dimensional (2-D) antenna array, which is co-located with the macro cell antenna. The two-dimensional antenna is steerable in both the horizontal and vertical directions. The size of the microcell coverage area depends upon the distance from the cell site antenna as well as the dimensionality of the array, which determines the angular spread of the beam. Filter tap weights may be adjusted to point the beam to any desired location in the macrocell. The orthogonality between the macrocell and the microcell may be obtained either in the frequency domain or in the code domain, depending upon the system in which it is implemented.

20 Claims, 15 Drawing Sheets

CONTROL TECHNIQUE FOR A COMMUNICATION SYSTEM

BACKGROUND OF THE INVENTION

1. Field of the Invention

The present invention relates to a control technique for a communication system, and more particularly, to a control technique for a wireless communication system.

2. Description of the Related Art

Continuing growth in wireless telecommunications usage is placing increasing stress on the capacity of cellular systems which provide wireless telecom service. The limited frequency spectrum available for cellular communications demands that cellular systems have increased network capacity and adaptability to various communications traffic situations. Although the introduction of digital cellular systems has increased potential system capacity, these increases alone may be insufficient to satisfy added demand for capacity. Other measures to increase system capacity, such as decreasing the size of cells in metropolitan areas, may be necessary to meet growing demand.

Figure 1:
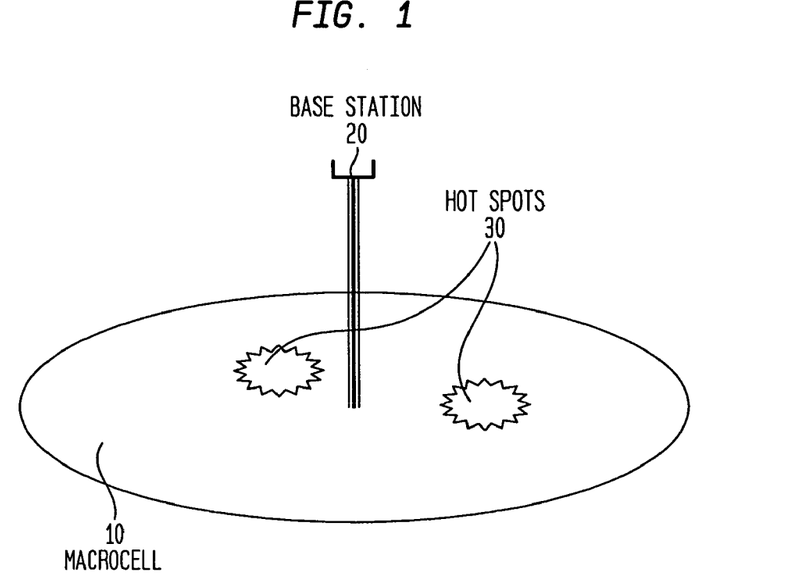
FIG. 1 illustrates a conventional macrocell including areas with relatively dense concentrations of mobile users, referred to as "hot spots".

It is known in the prior art that localized microcells and picocells may be established within overlying macrocells to handle areas with relatively dense concentrations of mobile users, sometimes referred to as "hot spots". FIG. 1 illustrates an example of a macrocell 10 served by a basestation 20 including two hot spots 30. Typically, microcells may be established for thoroughfares such as crossroads or streets, and a series of microcells may provide coverage for major traffic arteries such as highways. Microcells may also be assigned to large buildings, airports, and shopping malls. Picocells are similar to microcells, but normally cover an even smaller area, such as an office corridor or a floor of a high-rise building. The term "microcell" is used in this application to denote microcells, picocells, and any other "inner" layer of another cellular structure. The term "macrocell" is used in this application to denote the outermost layer of a cellular structure. An "umbrella cell" can be a macrocell or a microcell as long as there is a cell underlying the umbrella cell. Microcells allow additional communication channels to be located in the vicinity of actual need, thereby increasing cell capacity while maintaining low levels of maintenance.

Macrocell umbrella sites typically cover radii in excess of 1 kilometer and serve rapidly moving users, for example people in automobiles. Each microcell site is usually served by a separate low power, small radio base station, with its own antenna that is located within the microcell and which primarily handles slow moving users such as pedestrians. Each microcell site is connected to a macrocell site through a transmission medium, such as digital radio transmission or optical fibers. Microcells suffer from a series of problems, including an increased sensitivity to traffic variations, interference between microcells, and difficulty in anticipating traffic intensities.

As the capacity of cellular systems has increased, cell sizes have decreased, in some networks to as small as 0.5 km radius, such that controlling co-channel interface has become a major problem. The use of microcells is a way of increasing capacity still further. In a microcellular layout, base station antennas are placed below the building height in urban areas, and low power is used such that the propagation characteristics between base station and mobile are dominated by the street layout. Interference from adjacent cells may be blocked by buildings.

Microcellular techniques allow significantly higher traffic densities to be achieved, and also enable smaller, lower power mobiles to be used. The use of microcells requires improved handover, i.e., handoff, techniques, which allow for fast and reliable handoff, for example when turning a street corner. One way of easing handover problems is to employ an "umbrella cell" arrangement using conventional cells overlaying the microcells such that handover can be made into the umbrella cell where no suitable adjacent microcell can be identified. This also avoids the need to plan a contiguous microcell coverage in an urban area.

Figure 2:
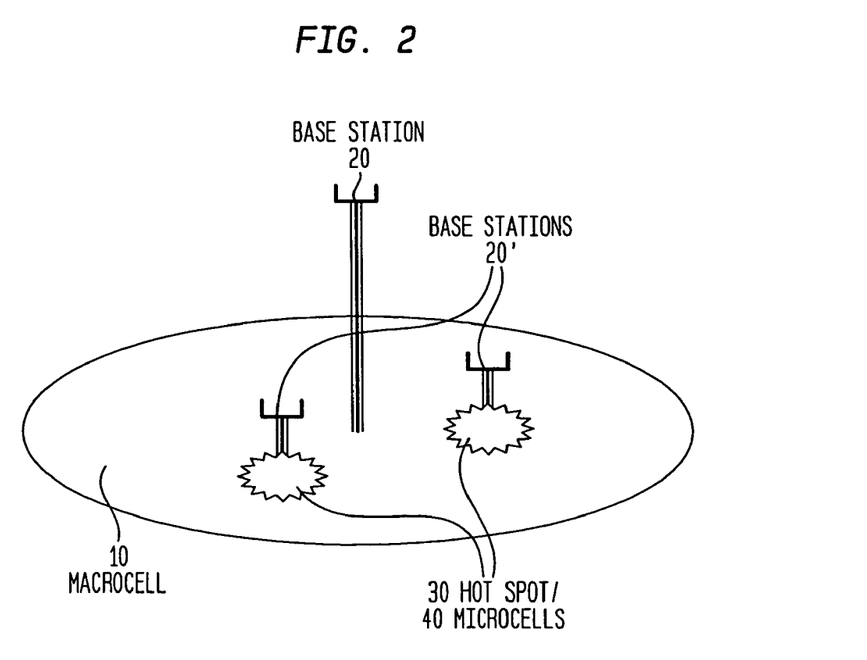
FIG. 2 illustrates a macrocell employing a conventional solution to the hot spot problem.

The current solution for dealing with the hot spot problem illustrated in FIG. 1 is to create microcells within the macro-cells, i.e., to introduce hierarchy in the cell. As illustrated on FIG. 2, two microcells 40 are formed at the two hot spots 30. The macrocell 10 acts as the umbrella cell. Such a solution requires installing basestations 20' in each hot spot coverage area, which is costly. Moreover, this solution assumes that the hot spots 30 do not move with time.

SUMMARY OF THE INVENTION

The present invention provides a novel communication management technique for systems including microcells, which reduces the problems described above with conventional communication systems including microcells. In particular, the principle of the present invention solves the above-identified problem by co-locating the microcell antenna with the macrocell antenna.

In order to achieve this, in one embodiment of the present invention, the microcell basestation utilizes a two-dimensional (2D) antenna array, which is co-located with the macrocell antenna. The two-dimensional antenna array is steerable in both the horizontal and vertical directions. The size of the microcell coverage area depends upon the distance from the cell site antenna as well as the dimensionality of the array, which determines the angular spread of the beam.

Other cost savings may be realized by co-locating and possibly sharing other common macrocell and microcell basestation components.

In the present invention, "co-location" may be defined as within 30 feet, or more preferably within 15 feet, or even more preferably within 5 feet, and even more preferably within 2 feet. "Co-located" may also be defined as on the same antenna tower regardless of distance separation.

Filter tap weights may be adjusted to point the beam for the microcell to any desired location in the macrocell. The orthogonality between macrocell and the microcell may be obtained either in the frequency domain or in the code domain. For TDMA systems, separation may be in the frequency domain, whereas for CDMA systems, the separation may either be in the frequency domain or in the code domain.

DETAILED DESCRIPTION OF THE PREFERRED EMBODIMENTS

Figure 3:
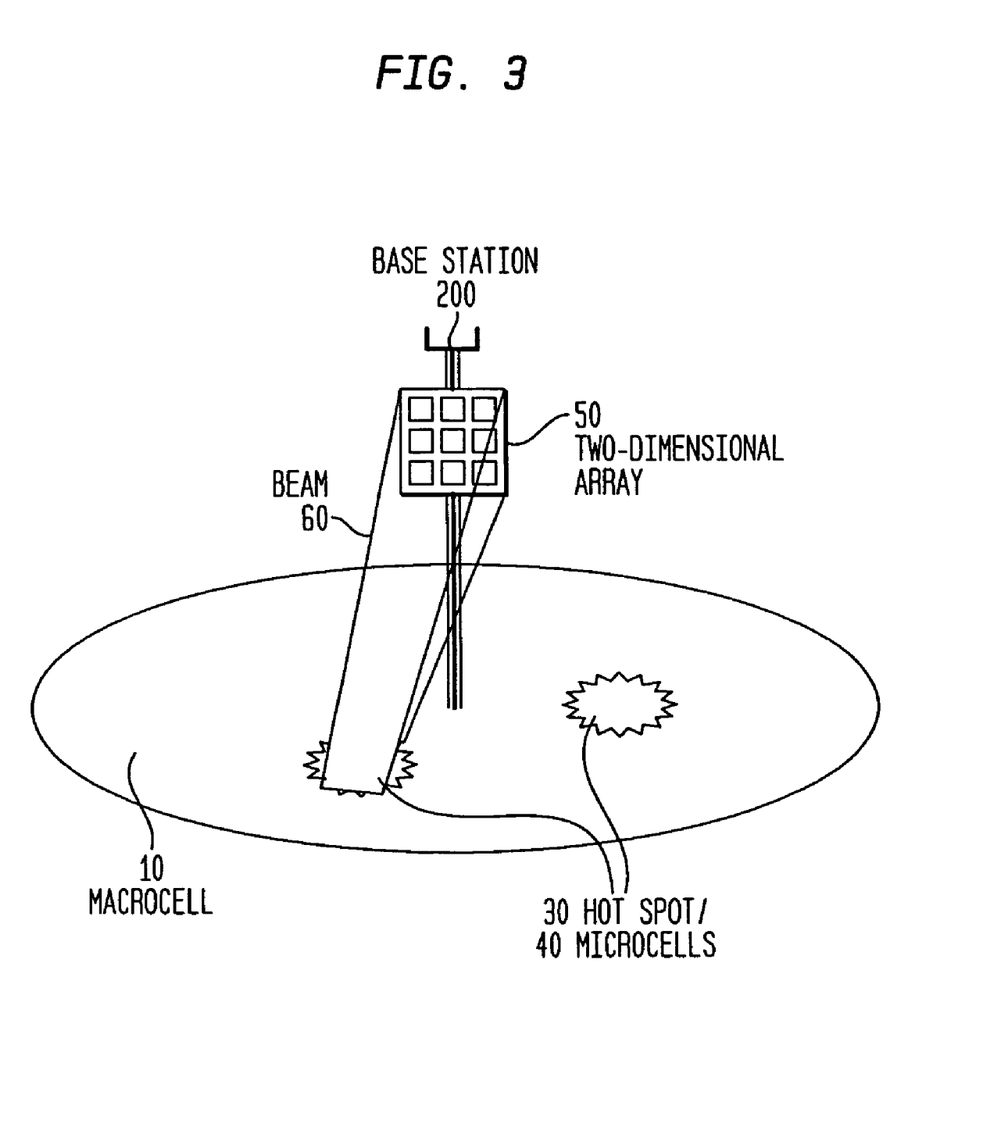
FIG. 3 illustrates the communication management technique of the present invention in one embodiment.

FIG. 3 illustrates the present invention in one exemplary embodiment. As illustrated in FIG. 3, macrocell 10 is served by basestation 200. In order to handle two hot spots 30 with relatively dense concentration of mobile users, the present invention identifies microcells 40 at the location of each of the hot spots 30. A two-dimensional array 50 is provided at the same location as the basestation 200 for each of the identified hot spots 30/microcells 40. For clarity, FIG. 3 only illustrates one of the two-dimensional arrays 50. Each two-dimensional array 50 performs three-dimensional beamforming to steer a microcell 40 to a desired location, namely, a hot spot 30. Each two-dimensional array 50 is steerable in both the horizontal and vertical directions.

Figure 4:
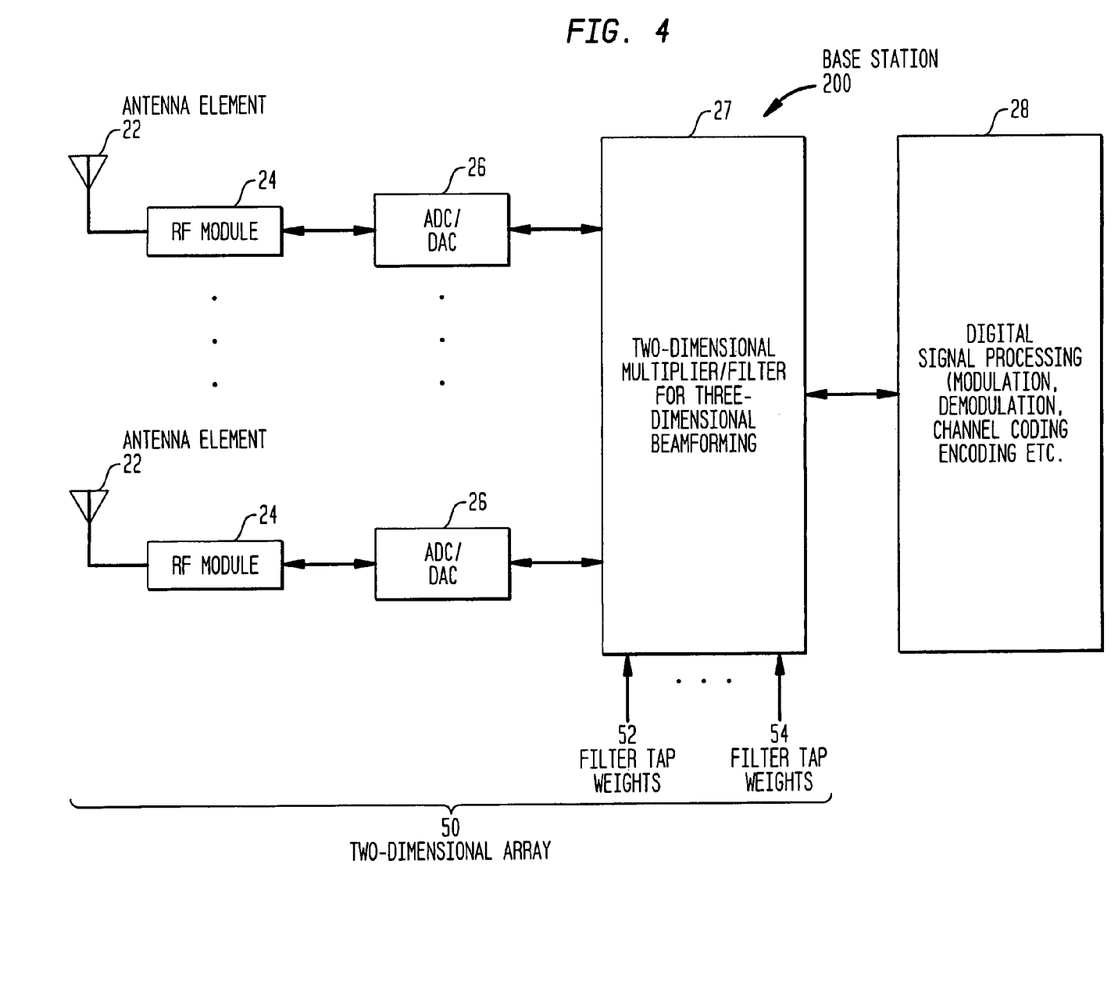
FIG. 4 illustrates a base station of the present invention in one embodiment.

FIG. 4 illustrates the relationship of the two-dimensional array 50 with the base station 200. In particular, FIG. 4 illustrates at least two antenna elements 22, at least two radio frequency (RF) modules 24, at least two analog-digital converter/digital-analog converters (ADC/DAC) 26, two-dimensional digital multiplier/filter 27 for three-dimensional beamforming, conventional digital signal processing 28, and filter tap weights 52, 54.

Figure 5A:
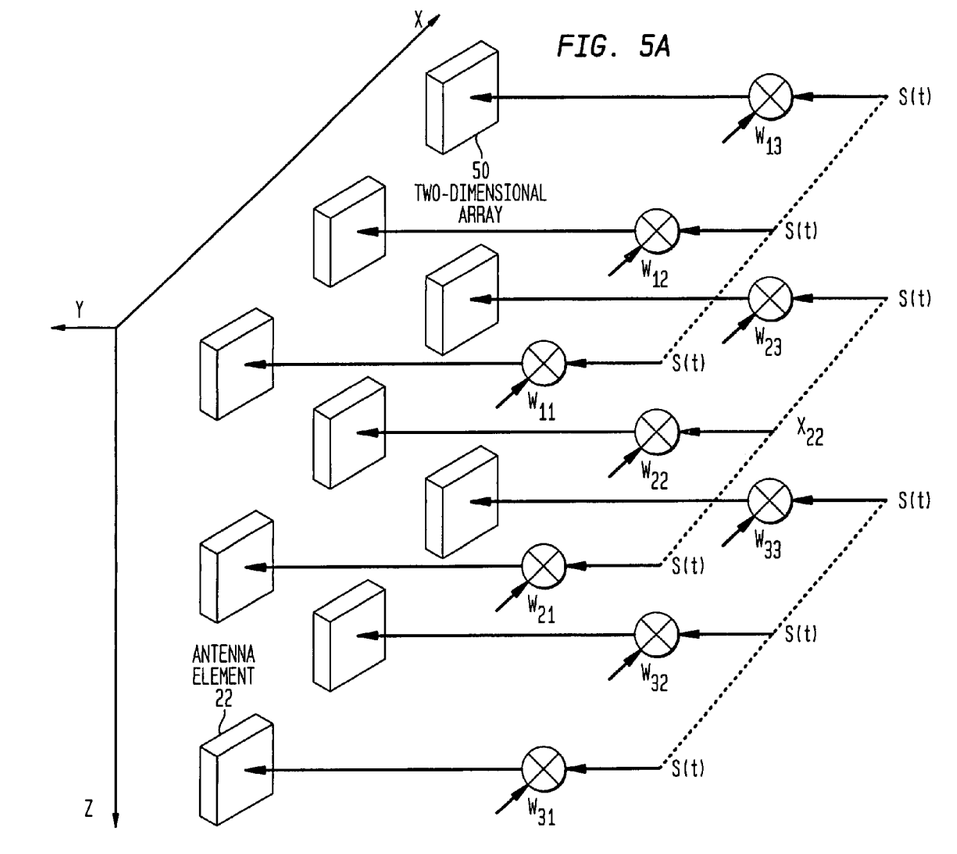
FIGS. 5(a) and 5(b) illustrate the filter tap weights applied to the two-dimensional array of FIG. 3 in a transmit and receive mode, respectively.
Figure 5B:
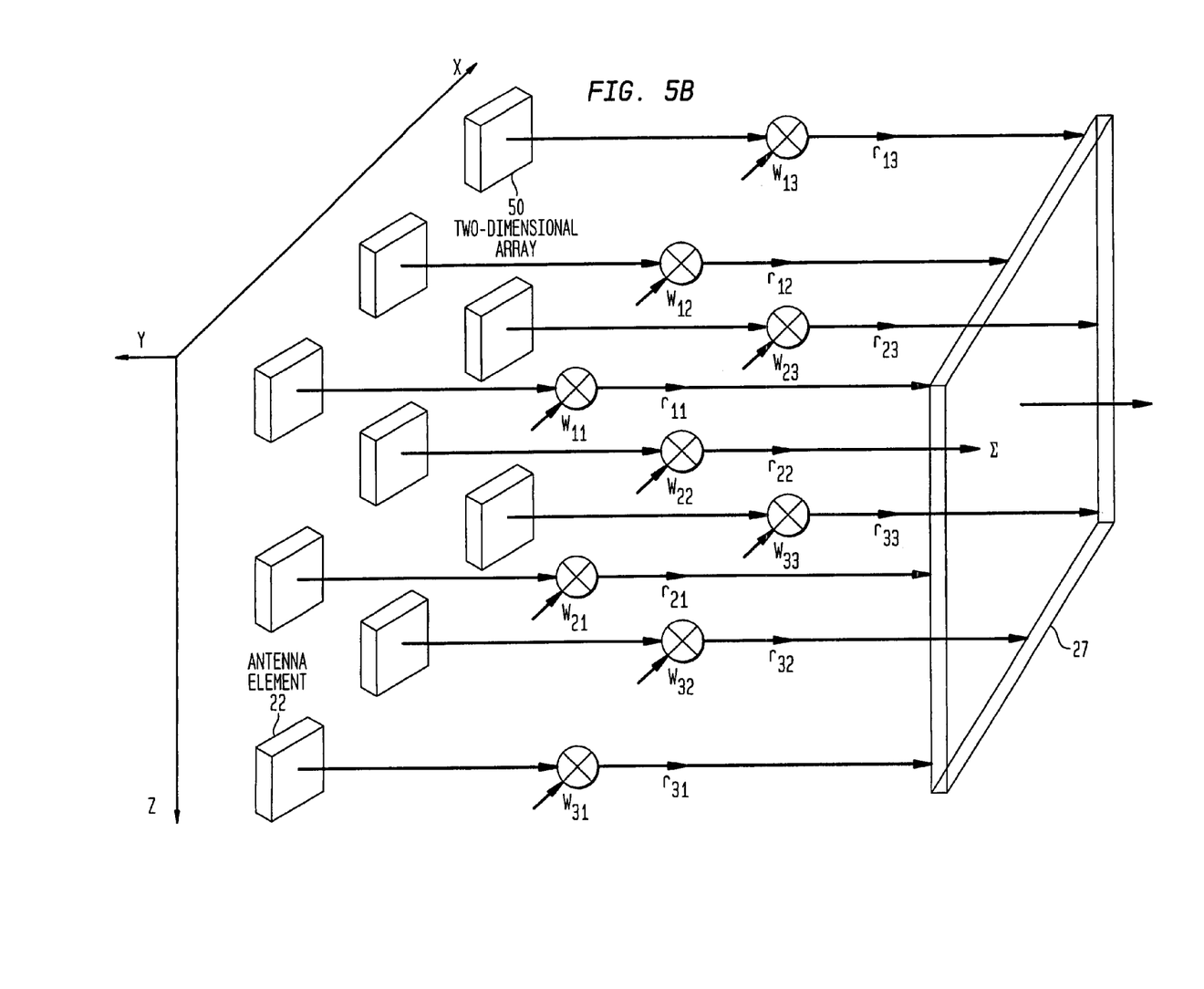

As described above, the filter tap weights 52, 54 for each antenna element 22 may be adjusted to steer the beam 60 to any desired location in the macrocell 10. Examples of beam steering are illustrated in FIGS. 5(a) and 5(b). As illustrated in FIG. 5(a), the tap weights $w_{ij}$ may be varied in a transmit mode, to point the beam from the base station 200 to a given hot spot 30 in the macrocell 10. In particular, the weights $w_{11}$, $w_{12}$, $w_{13}$ etc. steer the beam horizontally, in the xy plane and the weights $w_{11}$, $w_{21}$, $w_{31}$ etc. steer the beam vertically, in the z plane, as illustrated in FIG. 5(a). As illustrated in FIG. 5(b), the tap weights $w_{ij}$ may also be varied in a receive mode, to point the beam from a given hot spot 30 in the macrocell 10 to the base station 200. As set forth above in conjunction with FIG. 5(a), the weights $w_{11}$, $w_{12}$, $w_{13}$ etc. steer the beam horizontally, in the xy plane and the weights $w_{11}$, $w_{21}$, $w_{31}$ etc. steer the beam vertically in the z plane, as illustrated in FIG. 5(b).

Figure 6:
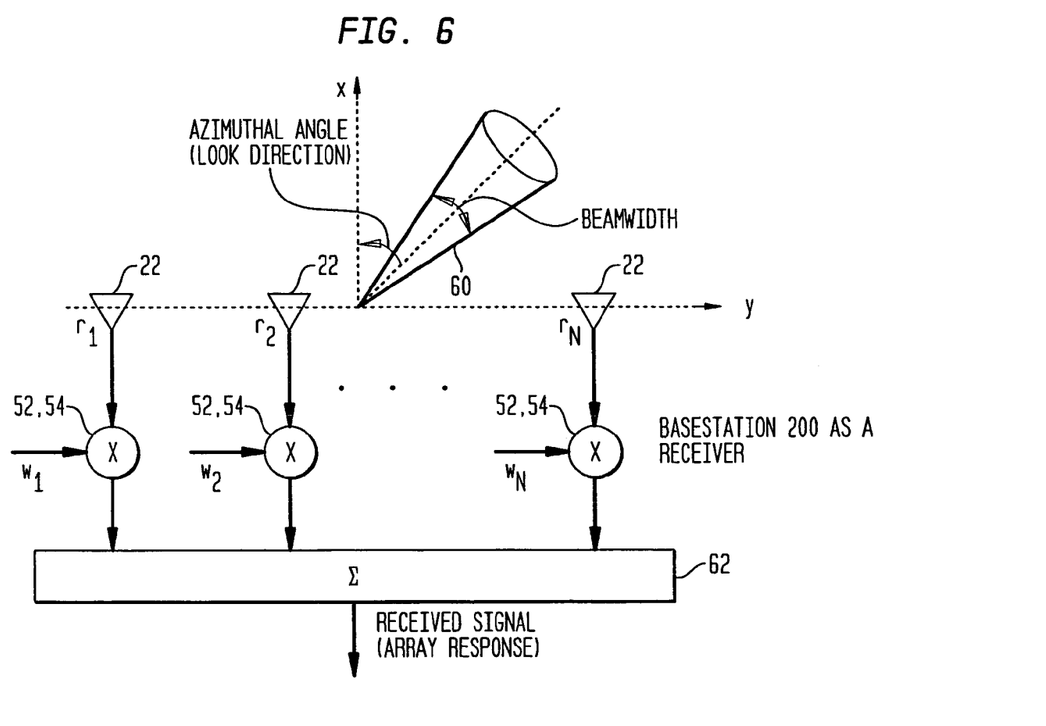
FIG. 6 illustrates the base station of FIG. 4 acting as a receiver.
Figure 7:
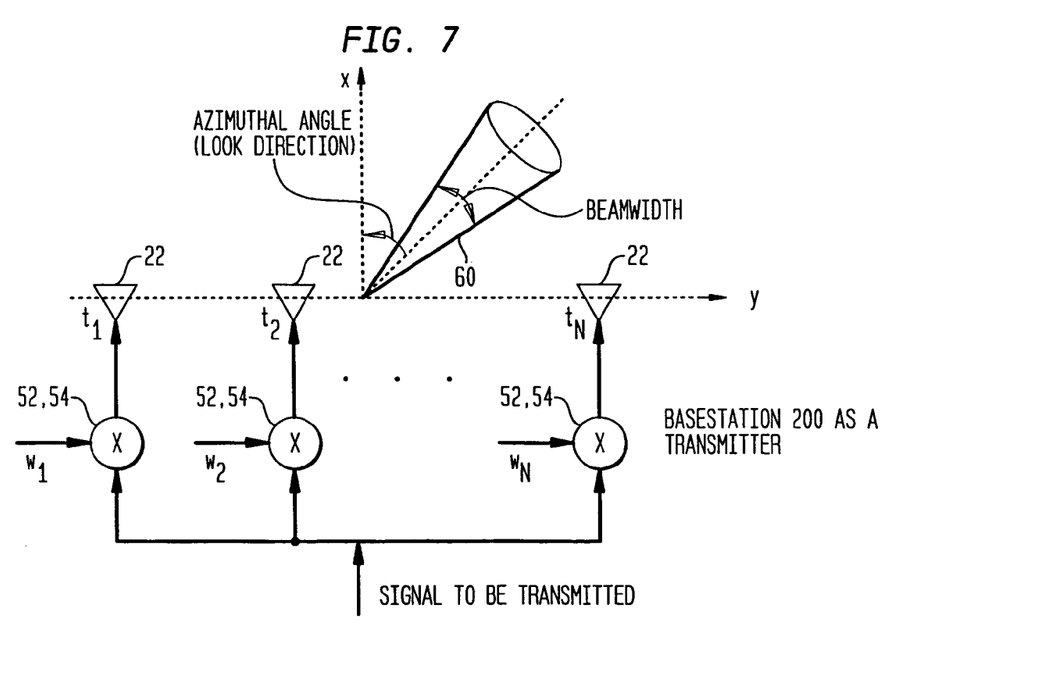
FIG. 7 illustrates the base station of FIG. 4 acting as a transmitter.

FIG. 6 illustrates base station 200 acting as a receiver and shows an example of spatial filtering when receiving a localized beam pattern in two dimensions. As illustrated in FIG. 6, weighting coefficients $W_{1 \ldots N}$ are utilized to weight the inputs from each of at least two antenna elements 22, which are then input to a summer 62 to produce a received signal as the array response. Similarly, FIG. 7 illustrates base station 200 acting as a transmitter. In both FIGS. 6 and 7, to localize the beam in the vertical (z) direction in addition to the azimuthal (xy) direction, would require another set of taps for each of the N azimuthal branches. This additional set of taps is omitted from FIGS. 6 and 7 for clarity.

Figure 8:
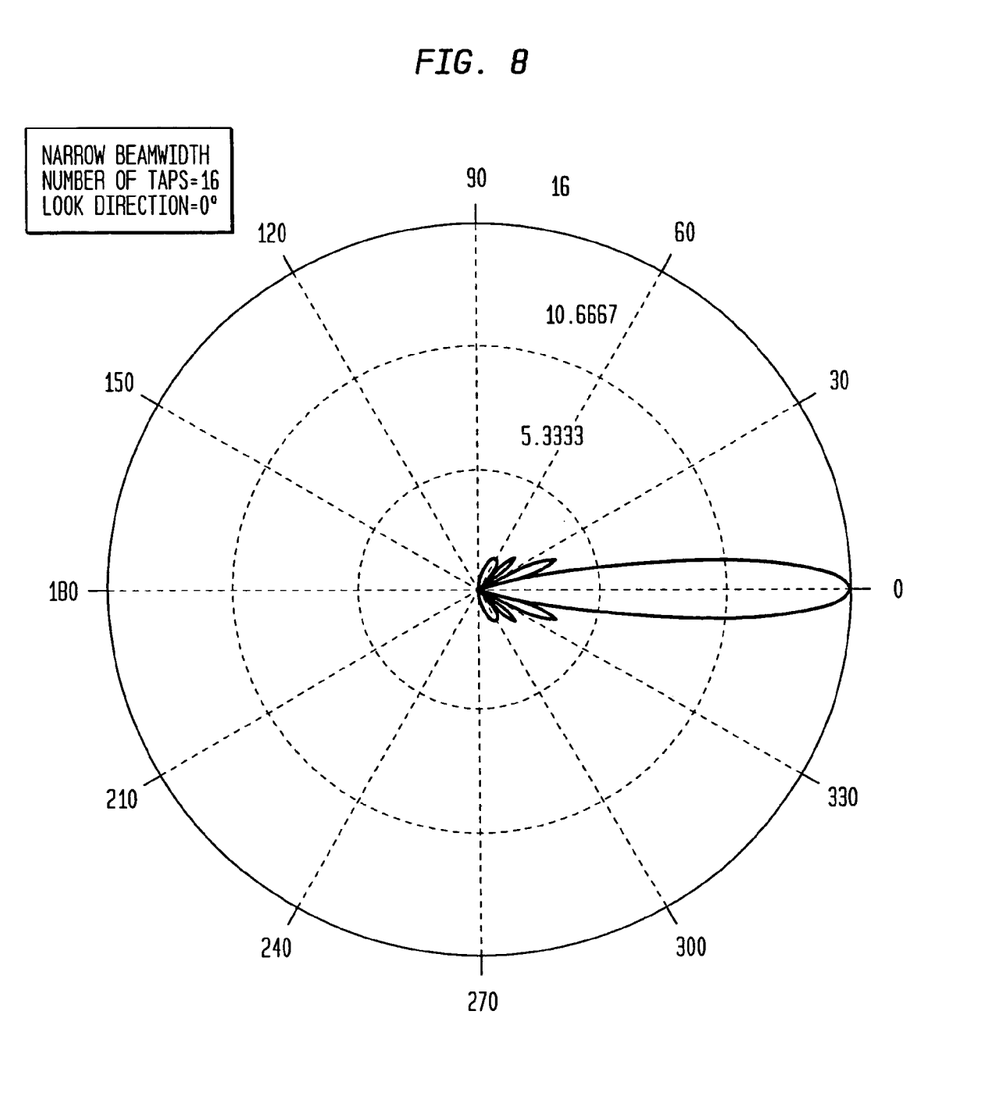
FIGS. 8–15 illustrate beam patterns and array responses for different numbers of filter taps and different look directions.
Figure 9:
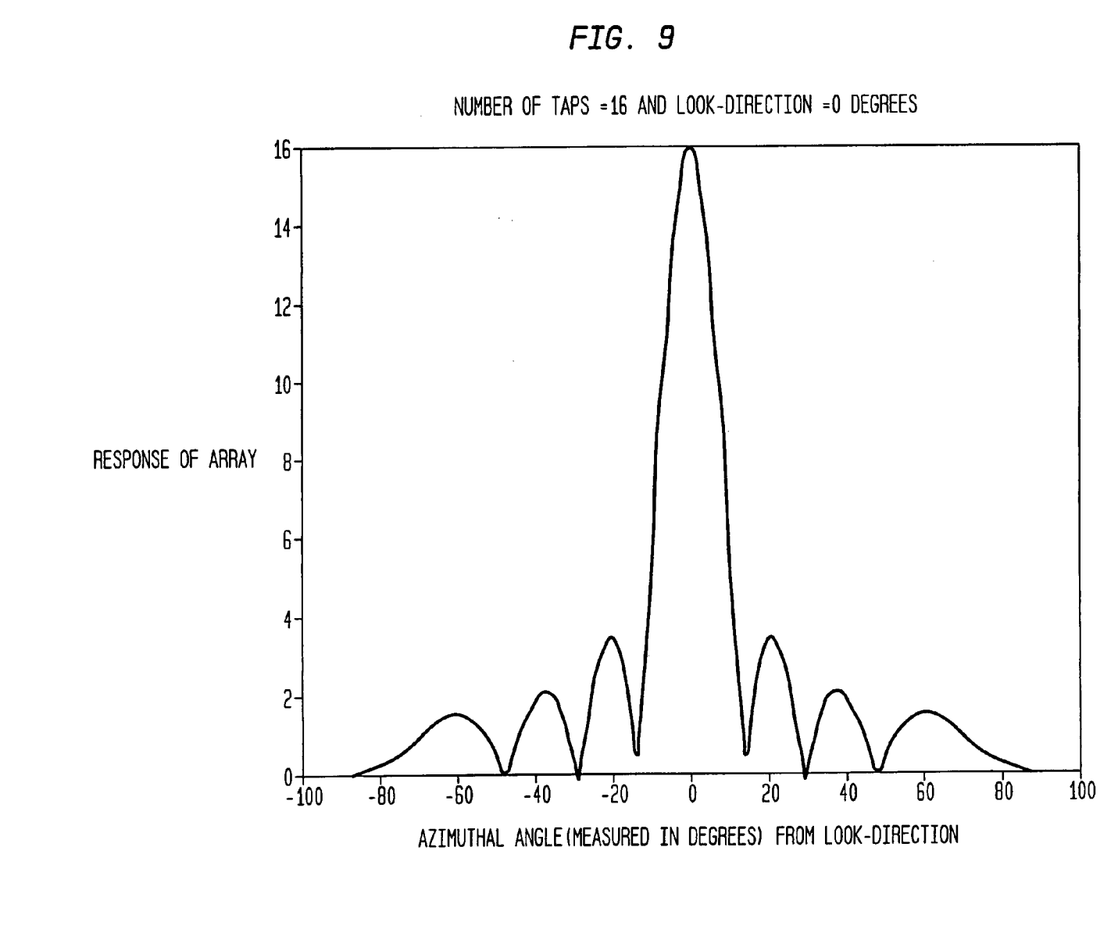
Figure 10:
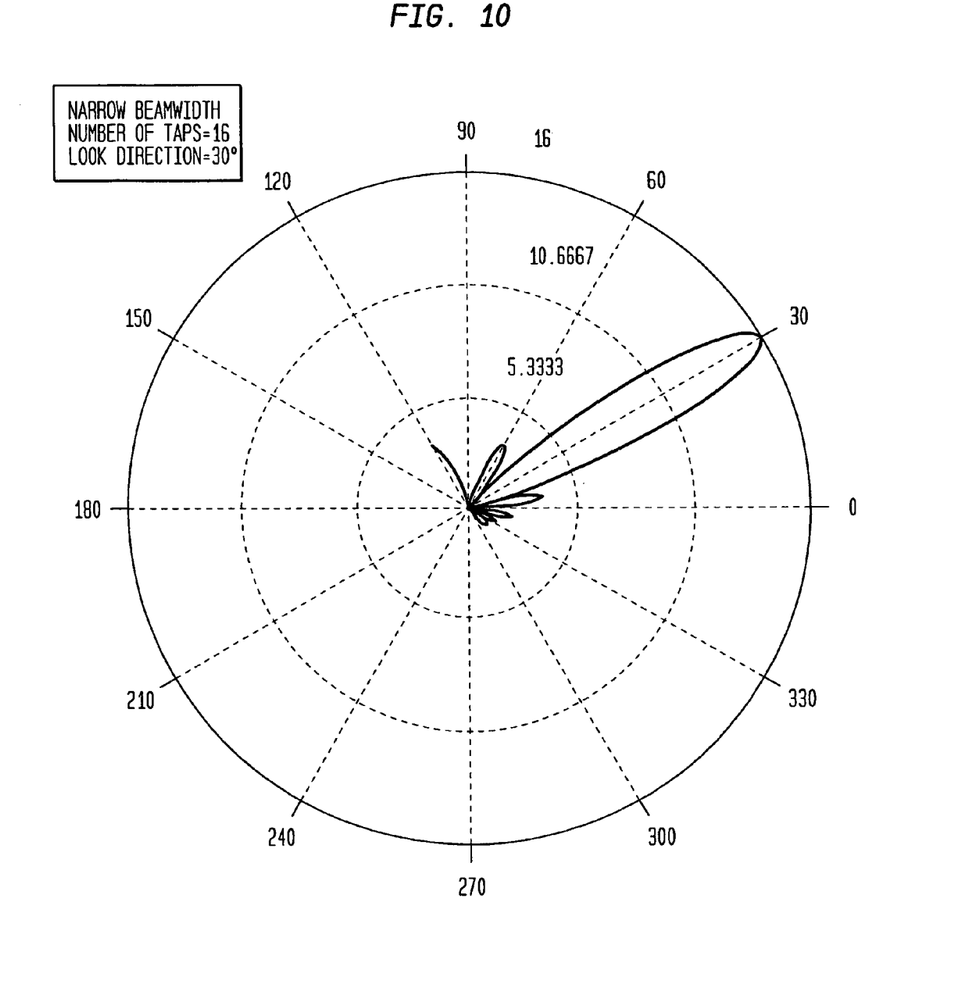
Figure 11:
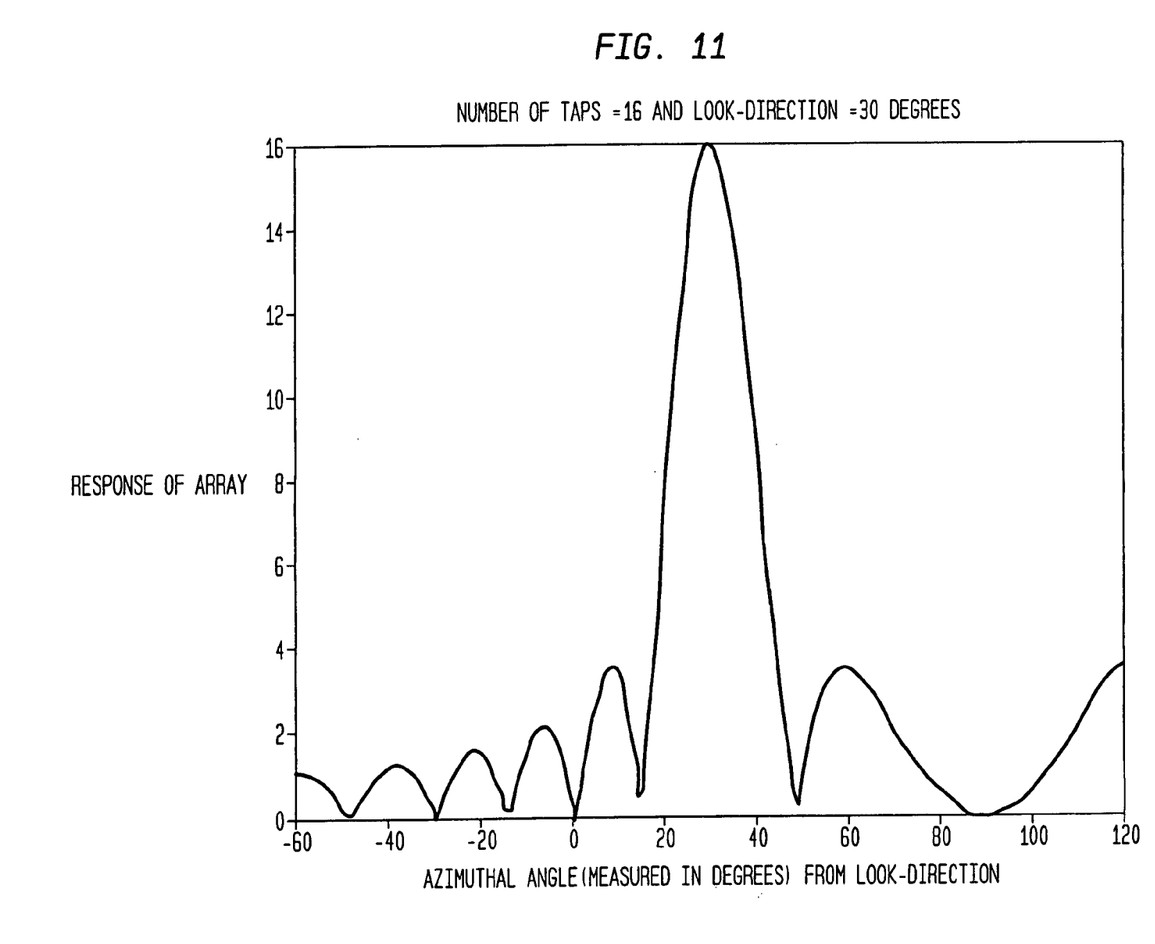
Figure 12:
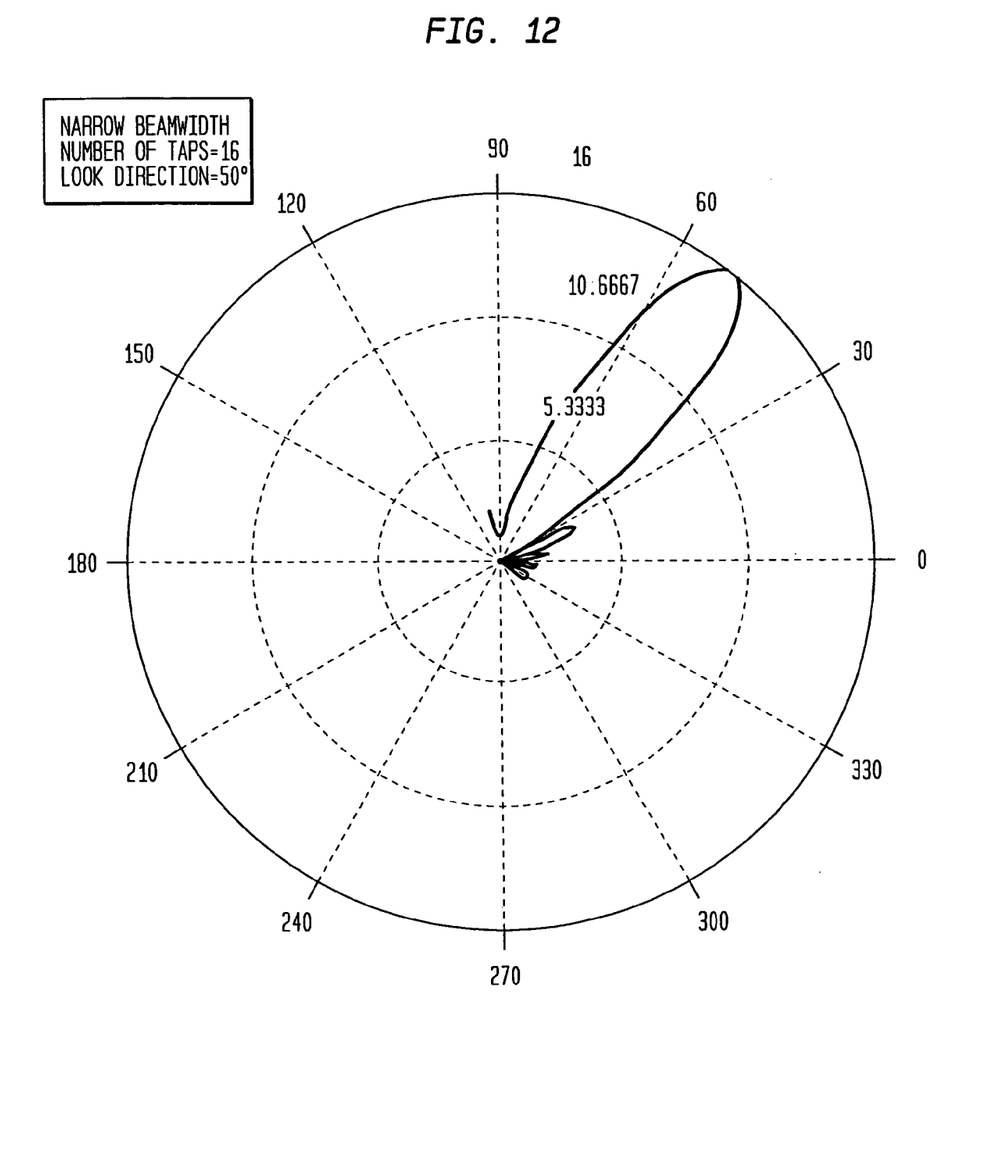
Figure 13:
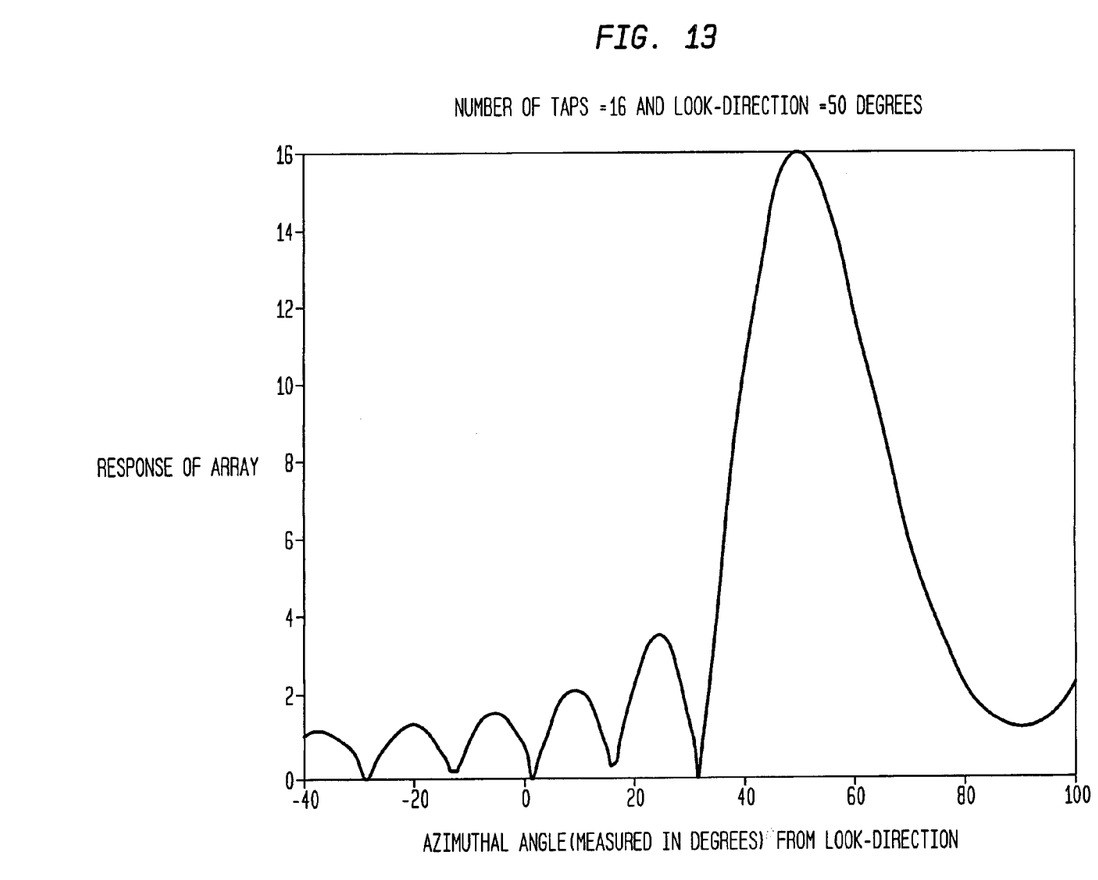
Figure 14:
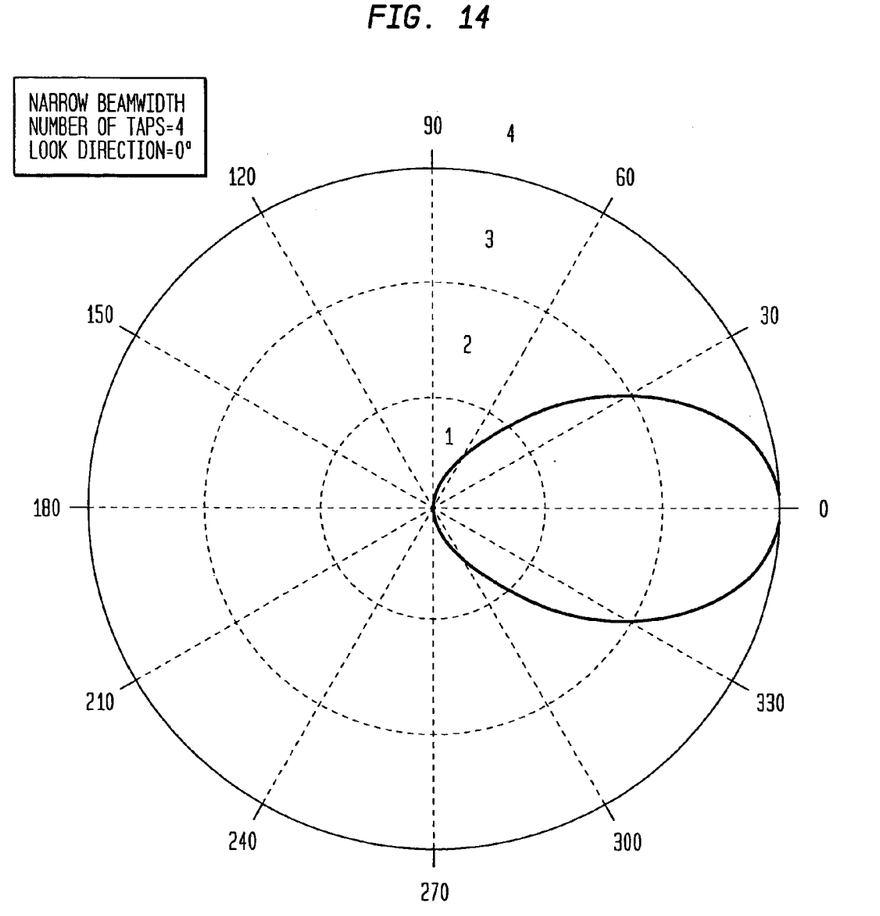
Figure 15:
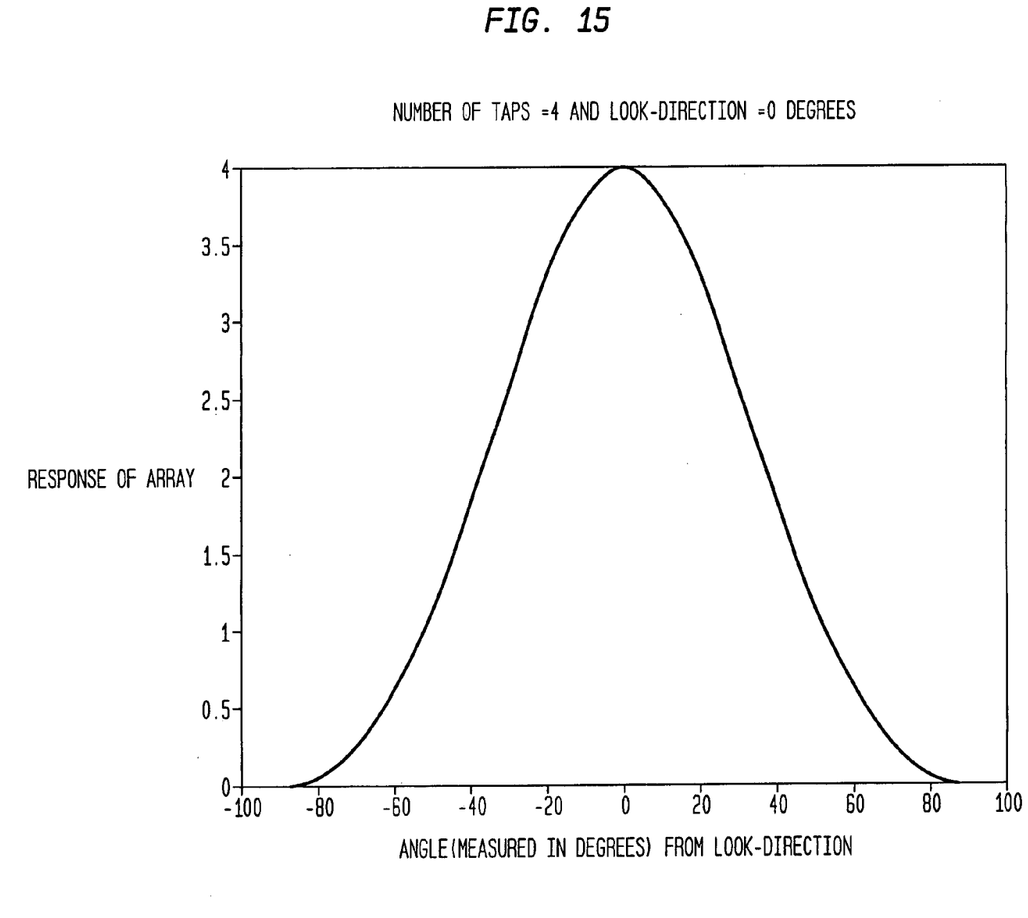

The angular spread of the three-dimensional beam 60 can be varied by changing the number of taps 52, 54 in the two-dimensional array 50. More taps 52, 54 allow a narrower beam to be created; fewer taps produce a wider beam. Moreover, the "look direction" of the beam 60 can be changed via the tap weights as well. Once the number of taps is fixed, the beam can be steered in three dimensions. FIGS. 8–9 illustrates a 16 tap beam with a look direction of 0°. FIGS. 10–11 illustrate a 16 tap beam with a look direction of 30°. FIGS. 12–13 illustrate a 16 tap beam with a look direction of 50°. Finally, FIGS. 14–15 illustrate a 4 tap beam with a look direction of 0°.

As described above, the two-dimensional arrays 50 may point the beam 60 any way in the macrocell 10 where the foot print of the beam 60 can also be varied. This flexibility offers tremendous capability in adapting to varying capacity needs in a macrocell.

Further, the physical two-dimensional array of antennas can be either placed in a two-dimensional plane or on the surface of a cylinder or any other desirable configuration. The fundamental operation of the three-dimensional beamforming is not affected by the physical placement of the antenna elements in the array.

Figure 16:
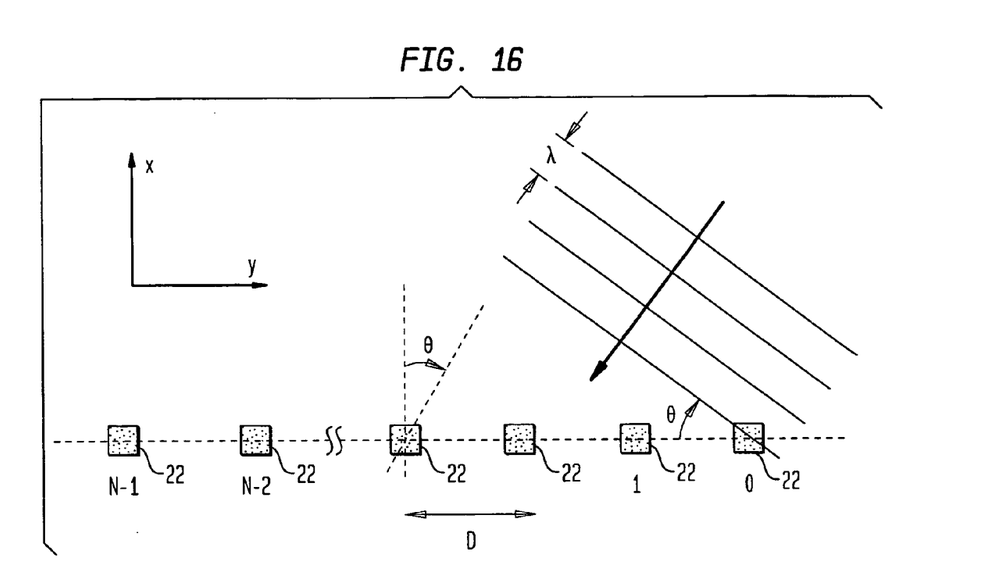
FIGS. 16–17 illustrate a configuration used to calculate exemplary filter taps.
Figure 17:
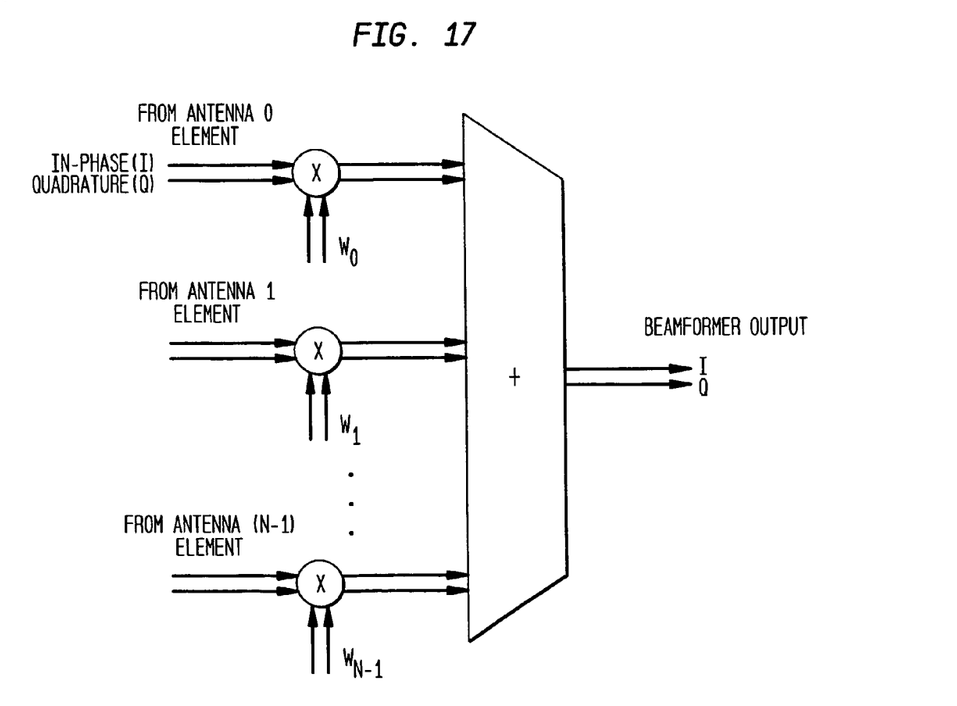

An exemplary filter tap calculation will now be described in connection with FIGS. 16–17. In particular, FIG. 16 illustrates the geometry of the elements 22 of the antenna array; in particular, FIG. 16 illustrates an antenna array with N elements, at a spacing d, with a look direction of θ. The incoming RF signal has a wavelength of λ. FIG. 17 illustrates the antenna array inputs to the beamformer. As illustrated in FIG. 17, each antenna element 0, 1, ..., N−1, N receives an in-phase (I) and a quadrature (Q) component from the incoming RF signal. Each antenna element (0, 1, ..., N−1, N) also includes a weight ($w_0$, $w_1$, ... $w_{N-1}$, $w_N$). The complex coefficients for the K-th filter tap are given by:

$$w_j = \cos\left[2\pi \frac{Kd}{\lambda} \sin\theta\right] - i \cdot \sin\left[2\pi \frac{Kd}{\lambda} \sin\theta\right]$$

For example, if N=16, d=0.25*λ, and θ=50°, for K=0 to 15, the 16 filter tap coefficients are:

1.0000
0.3593+0.9332i
−0.7418+0.6706i
−0.8923+0.4514i
0.1006−0.9949i
0.9646−0.2635i
0.5925+0.8056i
−0.5389+0.8424i
−0.9797−0.2003i
−0.1651−0.9863i
0.8611−0.5084i
0.7839+0.6209i
−0.2978+0.9546i
−0.9979+0.0650i
−0.4192−0.9079i
0.6967−0.7174i

These sixteen values represent the weights $w_0$, $w_1$, ..., $w_{N-1}$, $w_N$, which are applied to the antenna elements in FIG. 17. The weights are multiplied with the in-phase (I) and quadrature (Q) elements received by each antenna element 22 to produce antenna element outputs. These outputs are summed in the beamformer to produce the I and Q beamformer output.

As set forth above, for TDMA systems, the macrocell and microcell may be separated in frequency, by performing a dynamic frequency allocation between the microcell and the umbrella cell. For CDMA systems, this separation can be either in frequency or in the code domain.

Although the present invention has been described in connection with the preferred embodiments above, there are many variations to these embodiments, as would be known to one of ordinary skill in the art. In particular, as described above, the antenna macrocell 10 is an omnidirectional antenna. However, the macrocell 10 could also be implemented utilizing an n-dimensional array (n≧1).

As illustrated in FIGS. 5(*a*), 5(*b*), 6 and 7 and described above, the two-dimensional multiplier/filter 27 includes a plurality of multipliers. However, the two-dimensional multiplier/filter 27 may also include a space-time filter and therefore, also perform filtering and convolution.

As described above, the present invention may be utilized in either a TDMA or CDMA system. However, the present invention may also be utilized in any number of communication systems.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A base station, servicing a macrocell and at least one microcell, comprising:
   at least one steerable N-dimensional (N≧2) antenna array within the macrocell for serving the microcell and co-located with a macrocell antenna of said base station, the steerable N-dimensional antenna array including at least two antenna elements and an N-dimensional digital filter for receiving inputs from said at least two antenna elements and processing the inputs to produce a resultant output beam,
   wherein at least one of the inputs and outputs are weighted using filter tap weighting coefficients of a plurality of filter taps to steer the resultant output beam, and
   wherein the weighting coefficients of a given filter tap are determined as a function of an antenna element spacing value between antenna elements, a look direction of the resultant output beam and a wavelength of an incident signal.

2. The base station of claim 1, wherein said at least one steerable N-dimensional array serving the microcell is co-located on an antenna tower with the antenna serving the macrocell.

3. The base station of claim 1, wherein the microcell includes a hot spot.

4. The base station of claim 1, wherein said base station includes a steerable N-dimensional (N≧2) array for each microcell within the macrocell.

5. The base station of claim 1, wherein said at least one steerable N-dimensional (N≧2) array serves a hot spot.

6. The base station of claim 1, wherein an angular spread and the look direction of the resultant output beam are varied by varying a number of the plurality of filter taps.

7. The base station of claim 1, wherein said at least two antenna elements are arranged in a two-dimensional plane or on a surface of a cylinder.

8. The base station of claim 6, wherein the weighting coefficients for a given filter tap are complex coefficients, $w_j$, determined by:

$$w_j = \cos\left[2\pi\frac{Kd}{\lambda}\sin\theta\right] - i\cdot\sin\left[2\pi\frac{Kd}{\lambda}\sin\theta\right]$$

where
   k=the filter tap,
   d=antenna element spacing,
   θ=look direction of the resultant output beam, and
   λ=wavelength of an incident signal.

9. The base station of claim 1, wherein said base station is part of a TDMA system and the macrocell and the microcell are separated in the frequency domain.

10. The base station of claim 1, wherein said base station is part of a CDMA system and the macrocell and the microcell are separated in one of the frequency and the code domains.

11. A method of servicing at least one microcell in a macrocell, the at least one microcell and the macrocell supported by a base station, comprising:
   co-locating, with a macrocell antenna at the base station, at least one steerable N-dimensional (N≧2) antenna array within the microcell, the N-dimensional antenna array having at least two antenna elements and an N-dimensional digital filter;
   receiving inputs from said at least two antenna elements at said N-dimensional digital filter;
   processing the inputs at said N-dimensional digital filter to produce a resultant output beam for serving the microcell; and
   steering the resultant output beam toward the at least one microcell,
   wherein steering further includes using filter tap weighting coefficients to weight at least one of the inputs and outputs to steer the resultant output beam, and
   wherein the weighting coefficients of a given filter tap determined as a function of an antenna element spacing value between antenna elements, a look direction of the resultant output beam and a wavelength of an incident signal.

12. The method of claim 11, wherein said at least one steerable N-dimensional array serving the microcell is co-located on an antenna tower with the antenna serving the macrocell.

13. The method of claim 11, wherein the microcell includes a hot spot.

14. The method of claim 11, wherein said co-locating step includes co-locating a steerable N-dimensional (N≧2) array with the base station for each microcell within the macrocell.

15. The method of claim 11, wherein the at least one steerable N-dimensional array serves a hot spot.

16. The method of claim 11, further comprising varying a number of said plurality of filter taps of the resultant output beam to vary an angular spread and the look direction of the resultant output beam.

17. The method of claim 11, further comprising arranging the at least two antenna elements in a two-dimensional plane or on a surface of a cylinder.

18. The method of claim 16, the weighting coefficients for a given filter tap are complex coefficients, $w_j$, determined by $$w_j = \cos\left[2\pi\frac{Kd}{\lambda}\sin\theta\right] - i\cdot\sin\left[2\pi\frac{Kd}{\lambda}\sin\theta\right]$$

where
k=the filter tap,
d=antenna element spacing,
θ=look direction of the resultant output beam, and
λ=wavelength of an incident signal.

19. The method of claim 11, wherein the base station is part of a TDMA system and the macrocell and the microcell are separated in the frequency domain.

20. The method of claim 11, wherein the base station is part of a CDMA system and the macrocell and the microcell are separated in one of the frequency and the code domains.

* * * * *